(12) United States Patent
Snow (10) Patent No.: US 10,410,259 B2
(45) Date of Patent: Sep. 10, 2019

(54) MULTI LAYERED INFORMATION DISTRIBUTION TOOL

(71) Applicant: Andrew Snow, Westport, CT (US)

(72) Inventor: Andrew Snow, Westport, CT (US)

(*) Notice: Subject to any disclaimer, the term of this patent is extended or adjusted under 35 U.S.C. 154(b) by 118 days.

(21) Appl. No.: 15/211,691

(22) Filed: Jul. 15, 2016

(65) Prior Publication Data

US 2016/0321710 A1 Nov. 3, 2016

Related U.S. Application Data

(63) Continuation-in-part of application No. 12/854,439, filed on Aug. 11, 2010, now Pat. No. 9,430,774.

(60) Provisional application No. 61/233,293, filed on Aug. 12, 2009.

(51) Int. Cl.
*G06Q 30/00* (2012.01)
*G06F 17/00* (2019.01)
*G06Q 30/02* (2012.01)
*G06F 3/0482* (2013.01)
*G06F 16/28* (2019.01)
*G06F 16/9535* (2019.01)
*G06F 16/954* (2019.01)

(52) U.S. Cl.
CPC ....... *G06Q 30/0277* (2013.01); *G06F 3/0482* (2013.01); *G06F 16/282* (2019.01); *G06F 16/285* (2019.01); *G06F 16/954* (2019.01); *G06F 16/9535* (2019.01); *G06Q 30/02* (2013.01); *G06Q 30/0244* (2013.01); *G06Q 30/0273* (2013.01)

(58) Field of Classification Search
CPC .............................. G06Q 30/02; G06F 17/211
USPC .............................. 705/14.4, 14.73; 715/246
See application file for complete search history.

(56) References Cited

U.S. PATENT DOCUMENTS

| | | | |
|---|---|---|---|
| 7,062,453 | B1 | 6/2006 | Clarke |
| 7,089,237 | B2 | 8/2006 | Turnbull et al. |
| 2003/0023583 | A1 | 1/2003 | Eko |
| 2004/0230916 | A1 | 11/2004 | Salvatori et al. |
| 2005/0096979 | A1 | 5/2005 | Koningstein |
| 2007/0022020 | A1 | 1/2007 | Bernstein |
| 2007/0050251 | A1 | 3/2007 | Jain et al. |
| 2010/0313129 | A1 | 12/2010 | Hyman |

*Primary Examiner* — Sun M Li
(74) *Attorney, Agent, or Firm* — St. Onge Steward Johnston & Reens, LLC (57) ABSTRACT

A system and method for creating online advertising economies of scale by maximizing quantity, applicability, accessibility and distribution of advertisements on a webpage that includes providing a tool to reside on a webpage that presents a first tier of data to a user. Upon the user selecting one of the first tier of data, the tool may expand from a passive footprint to an active footprint presenting a second tier of data in the expanded area. The expanded area includes a first and a second frame, such that, upon selection of one of the second tier of data in either the first or second frames, third tier data overwrites the second tier data in the frame opposite the frame selected by the user. The user is then able to continue alternatingly drilling down through the frames to obtain the data desired, including integrated related advertisement in various media formats.

28 Claims, 11 Drawing Sheets

MULTI LAYERED INFORMATION DISTRIBUTION TOOL

CROSS-REFERENCE TO RELATED APPLICATIONS

This patent application claims the benefit, under 35 U.S.C. § 119(e), of U.S. Provisional Patent Application Ser. No. 61/233,293, filed on Aug. 12, 2009, the content of which is incorporated herein by reference.

FIELD OF THE INVENTION

The invention relates to a multi-layered webpage tool, and more specifically, to a web distributable, multi layered, data tiered, and mouse-over/out driven tool that is capable of delivering a plurality of user-generated data points and dynamically served advertising from one expanding and collapsing foot-print locatable on any web page.

BACKGROUND OF THE INVENTION

The Internet is increasingly becoming a primary source of information individuals first look to in order to obtain information, goods and services. For example, online shopping allows an individual to virtually visit a store, to view and purchase the various articles for sale, which would then be sent to the individual. In this manner, an individual can purchase virtually any number of goods and/or services over the Internet without the need ever having to physically visit a particular location. Likewise, rather than look through a phone book or any other directory to find information, individuals are increasingly looking to search engines on the Internet. As a result of this shift to Internet, traditional forms of advertising are becoming less and less effective as more individuals use the Internet. For example, rather than consult the local phone book or yellow pages for commercial listings, an individual uses a search engine. As a result, fewer and fewer people see the advertisements displayed in the local phone book such that, the value of such an advertisement is greatly reduced.

With the increasing focus of attention on the Internet, companies have sought ways of monetizing this increasingly important form of consumer contact. One of the primary ways of accomplishing this is to sell ad space on a webpage. Many websites, in fact, are provided completely free of charge and derive substantially all of their revenues from selling advertising on their web page. For example, while news services traditionally sold newspapers, with associated advertisements placed in the newspapers, increasingly individuals are looking to the Internet to obtain news. Due to the Internet's relatively low costs and low barriers to entry, many news websites are provided free of charge, therefore, the need to derive advertising revenue is critical. However, there is only a limited about of valuable advertising space available on any single web page that can effectively capture a user's attention and focus. This is due to user behavioral patterns and their confines and limitations which stem from the nature of human interaction with online digital media. In other words, the web page designer/operator actually has limited space inventory available that is well placed and thus well monetizable that may be sold for advertising, in addition to the space needed for the primary application of the web page (e.g., presentation of news articles for a news website).

Another problem the web page designer/operator(s) must deal with is the need for more cost-efficient, user-friendly systems that present commercial and/or promotional information to users in a manner that is easier for the user to obtain and manipulate, and minimally impacts or interferes with other functions and/or visual representations on the web page. In other words, it is preferable that an advertisement presented to a user allow the user to obtain information about the product/service without navigating the user away from the current webpage.

Still further, with the incredibly large amount of information on the Internet, consumers need relevant, comprehensive, and updated information on products and services that is visibly accessible, intuitively generated, and user-friendly consumed.

SUMMARY OF THE INVENTION

Accordingly, what is desired is a system and method that allows a web page designer/operator to greatly increase the amount of revenue generated from advertisements on a web page.

It is further desired to provide a system and method that provides a more user-friendly interface for the presentation of commercial and/or promotional information.

It is still further desired to provide a system and method that provides for an increased amount of advertisements to be presented on a webpage that allows a user to browse one of any number of advertisements while not navigating the user away from the current webpage.

These and other objects are achieved in one advantageous embodiment with the provision of a web distributable tool that enables at least the following:

1. Thousands of user-generated targeted ads triggered by thousands of information points that stem from one leveraged footprint. The expandable and collapsible web footprint incorporates multiple advertising tiers by utilizing, for example, alternating layers.

2. Advertisers achieve efficiency, dynamism, and affordability due to the tool's new and significant economies of scale. Additionally, users who self-direct to specific information points are high value potential consumers for those points of interest and as such, advertisements directed to those users are very valuable.

3. The tool is user-location friendly as it can be placed on any site. Detailed user-driven information and relevant promotional material is generated by user-intuitive mouse-overs. For this application, the term "mouse-over" means the positioning of a courser over a location on a screen without requiring the user to click on the location to activate that location. There are no user-hesitant click-throughs and users don't need to leave the current web page to use the tool and be presented with a selected advertisement.

The tool is web distributable by code that may be placed on any web page, and in any place on the web page. In one embodiment, the code pulls the tool, including its ad displaying capabilities, from an external server (the tool server) where the tool itself is loaded and resides, as opposed to residing on the server of the web site on which the tool-pulling code is placed and on which the tool is shown. The ads themselves may, in one embodiment, reside on a separate ad server. Ad server capabilities are enabled within the tool. These capabilities include but are not limited to, for example, banner ads, video and rich media ads, geo-targeting for local ads, multi-ads, ad rotation, live links, and more.

Figure 3:
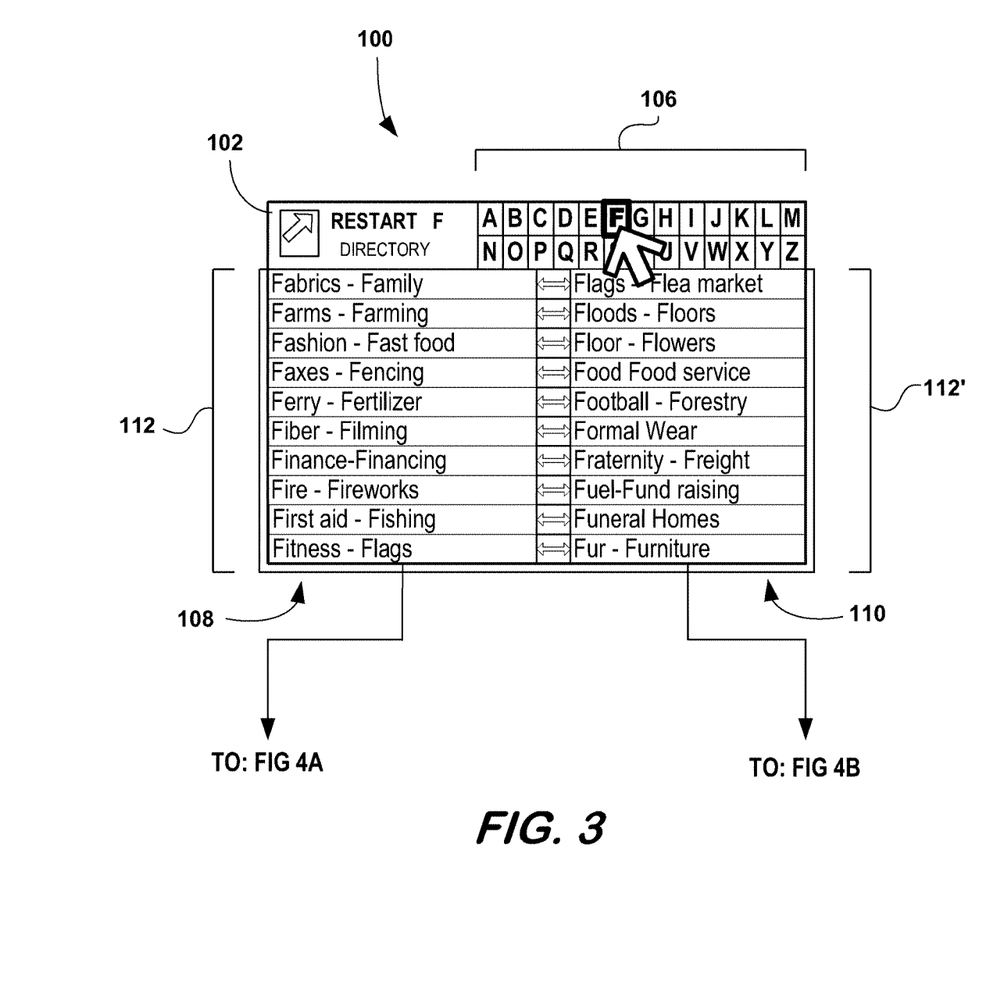
FIG. 3 is an illustration of the advantageous embodiment according to FIG. 2A.

It is contemplated that the tool may be presented to a user as a relatively small footprint (passive footprint) on a webpage. In one example the tool may be provided as a yellow pages directory. In this particular embodiment, the tool may present all the letters of the alphabet to the user in the passive footprint. If the user is looking for "pizza", the user may mouse-over the letter "p", which would then expand the footprint of the tool from the passive footprint to a larger footprint (active footprint). In the example discussed, the active footprint may provide a first frame of information that includes various alpha divided options/categories (for this application the terms "options" and "categories" are used interchangeably) for the letter "p." The user could then mouse-over to select the alpha divided category in which "pizza" would be found (e.g. "Pets-Plumbers"). Once selected, the tool's next layer is launched in the second frame that's within the active footprint, which could then display various options/categories for "Pets-Plumbers", and which could include, for example, "pizza delivery." The user could then mouse-over select "pizza delivery", which would launch the tool's next layer which would display in the first frame a listing of establishments that offer pizza delivery. When the user mouses-over any one of these listings, an advertisement for that establishment could then be displayed in the second frame. The user has the option then to simply read the advertisement or to click on the advertisement, which would then direct the user to the web page for the company offering pizza delivery the user has selected. In this manner, the tool provides for two different footprints, a small passive footprint, and a larger active footprint. The larger active footprint may be divided into two different frames that alternately display options/categories and listings as the user drills down into the tool's multiple layers to find the information they are looking for. The user is able to drill down by simply mousing-over the information and may collapse the tool to the passive footprint by moving the courser away from the tool. This allows the user to drill down through a very large amount of information quickly and efficiently within the same footprint and without creating a large amount of cascading windows being drawn across the webpage. Additionally, the tool contains a "restart" area which serves to facilitate the user in navigating the two-frame multi-layered data drilling down process. At anytime, and at any layer in the drill down process from the second data layer on, a user can mouse-over the "restart" area which results in the tool resetting itself to prior data option/category layers, a function that assists and enables a user to change course and choose a different data drill down path other than the one the user was on. In one embodiment, the "restart" button will reset the search process to a second data tier as illustrated in FIG. 3. In another embodiment, the "restart" button may reset the search process to any previous data tier selected by the user. In still another embodiment, the "restart" button may function as a "reverse" button to un-drill the search process by one tier to display the previous data tier. It is understood that the tool provides the user with increased versatility to both drill-down in a search process, but also, to incrementally reverse the process without requiring the user to start the process anew.

It should also be noted that in this particular embodiment, the user was able to navigate to find the information desired within the tool without having to navigate away from the current webpage on which the tool was located until after a pizza delivery advertisement was displayed in the tool and the user decided to click on it.

As can be seen, the website on which the tool is located is able to provide a very large amount of advertising on a single web page. Rather than being limited to providing only a handful of advertisements or products information, the tool provides a multi-tiered, alternating, two-frame arrangement that can provide virtually a near-unlimited amount of advertising on a single webpage.

For this application the following terms and definitions shall apply:

The term "data" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of the same predetermined information in a different physical form or forms.

The terms "user" or "users" mean a person or persons, respectively, who access data in any manner, whether alone or in one or more groups, whether in the same or various places, and whether at the same time or at various different times.

The term "network" as used herein includes both networks and internetworks of all kinds, including the Internet, and is not limited to any particular network or inter-network.

The terms "first" and "second" are used to distinguish one element, set, data, object or thing from another, and are not used to designate relative position or arrangement in time.

The terms "coupled", "coupled to", and "coupled with" as used herein each mean a relationship between or among two or more devices, apparatus, files, programs, media, components, networks, systems, subsystems, and/or means, constituting any one or more of (a) a connection, whether direct or through one or more other devices, apparatus, files, programs, media, components, networks, systems, subsystems, or means, (b) a communications relationship, whether direct or through one or more other devices, apparatus, files, programs, media, components, networks, systems, subsystems, or means, and/or (c) a functional relationship in which the operation of any one or more devices, apparatus, files, programs, media, components, networks, systems, subsystems, or means depends, in whole or in part, on the operation of any one or more others thereof.

The terms "process" and "processing" as used herein each mean an action or a series of actions including, for example, but not limited to the continuous or non-continuous, synchronous or asynchronous, direction of data, modification, formatting and/or conversion of data, tagging or annotation of data, measurement, comparison and/or review of data, and may or may not comprise a program.

In one advantageous embodiment a method for maximizing the distribution of advertisements on a webpage is provided comprising the steps of: coupling a computer to a network, providing a webpage on the computer that is accessible by a user computer and positioning a tool on the webpage. The method further comprises the steps of: presenting a first tier of data categories on the tool and expanding a footprint of the tool from a passive footprint to an active footprint when a user selects one of the first tier of data categories, the active footprint including a first frame and a second frame. The method still further comprises the steps of: presenting a second tier of data categories related to the selected one of the first tier of data categories in the first and second frames, selecting one of the second tier of data categories in the first frame and presenting a third tier of data in the second frame.

In another advantageous embodiment a system for maximizing the distribution of advertisements on a webpage is provided comprising: a website computer having a network connection and a storage, software executing on the website computer to generate a webpage accessible by a user computer via a network connection and software executing on the website computer, to present a tool on the webpage. The system is provided such that the tool has a passive footprint when in an inactive state and an active footprint in an active state, where the active footprint is larger than the passive footprint and the passive footprint comprises a first tier of data categories. The system is further provided such that when one data category of the first tier of data categories is selected, the tool expands to the active footprint and presents a second tier of data categories that is related to the selected one data category of the first tier of data categories. They system is still further provided such that the active footprint comprises a first frame and a second frame and the second tier of data is presented in the first and second frames and when one data category of the second tier of data categories is selected from the first frame, the tool presents a third tier data that is related to the selected one data category of the second tier of data categories in the second frame.

Other objects of the invention and its particular features and advantages will become more apparent from consideration of the following drawings and accompanying detailed description.

DETAILED DESCRIPTION OF THE INVENTION

Referring now to the drawings, wherein like reference numerals designate corresponding structure throughout the views.

Figure 1:
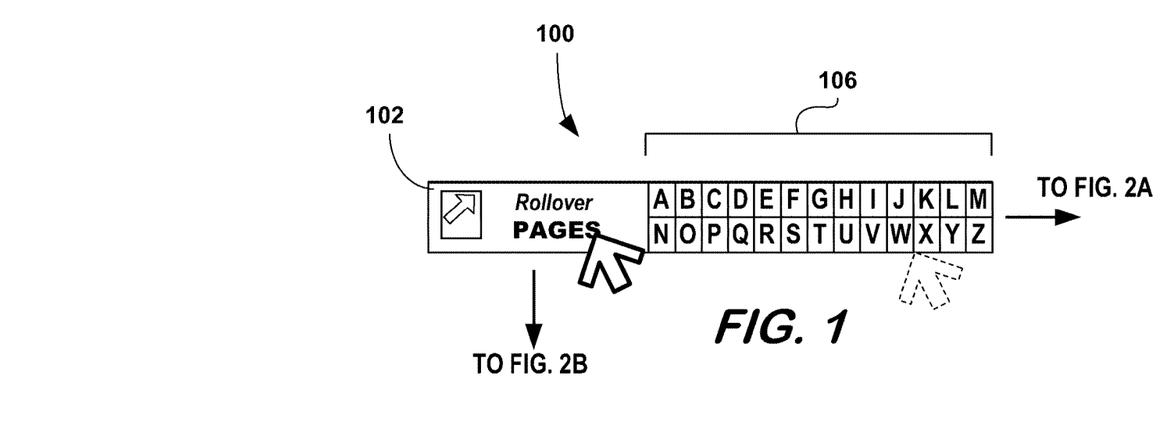
FIG. 1 is an illustration of one advantageous embodiment of the tool according to the present invention.

An illustration of one advantageous embodiment of the tool 100 is illustrated in FIG. 1. In this particular embodiment, the tool 100 is illustrated as a alphabetical commercial pages listing, such as a yellow pages listing.

The tool 100 may comprises web distributable code that may be placed on any web page (not shown), and in any location on the web page.

The tool 100 as illustrated in FIG. 1 is shown in an inactive state having a passive footprint (i.e., a relatively small footprint). The tool 100 may comprise a header 102, which displays the tool's title or topic and may include a link for obtaining the tool-pulling code for distribution to, for example, other websites. This link would also enable a user to download a desktop version of the tool 100. The header 102 may have multiple data options/categories from which a user may select by mouse-over. When header 102 is moused-over the tool 100 may expand either to an introductory/home page layer as illustrated in FIG. 2B, or to one of the tool's next tier of data option/category layers as illustrated in FIG. 3. The additional expanded area 104 may have multiple data options/categories located therein. The expanded area 104 will collapse if a user mouses-out of the tool 100 from any point in the tool 100, reverting the tool 100 to the passive footprint illustrated in FIG. 1. In one embodiment, the mouse-over expanding space 104 of the tool 100 supersedes and covers-up a size-corresponding part of the webpage. In another embodiment, the tool 100 "pushes" the page away in proportion to the expansion size, generating the expanded area 104 without covering up any part of the webpage.

FIG. 1 also illustrates that tool 100 comprises first tier data 106 (options/categories) located thereon. In this particular embodiment, first tier data 106 comprises an alphabetical listing of data options/categories that correspond to the letters of the alphabet. However, it is contemplated that first tier data 106 may comprise or be related to virtually any type of data including, for example but not limited to, a listing of vehicles (e.g. cars, sports cars, truck, vans, SUVs, etc.) available for sale (or for any other purpose, such as for rent) by type, make, model or price, or real estate listings, such as by geographical location or building design, etc., or a listing of cruise or travel offerings by destination or season, etc., or jobs available by vocation or location, etc., or any product catalogues or other inventory or item listings, including complete local yellow page type directory listings. It is understood that virtually any type of information can be listed in the first tier corresponding to the types of data the tool 100 is to provide.

Figure 2A:
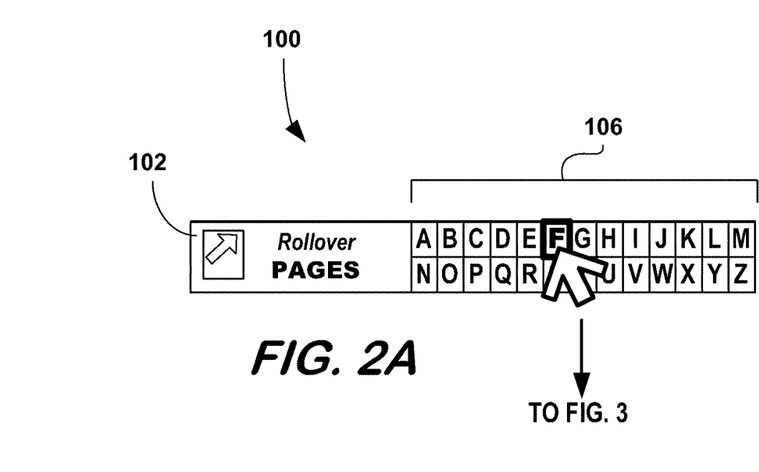
FIG. 2A is an illustration of the advantageous embodiment according to FIG. 1.
Figure 2B:
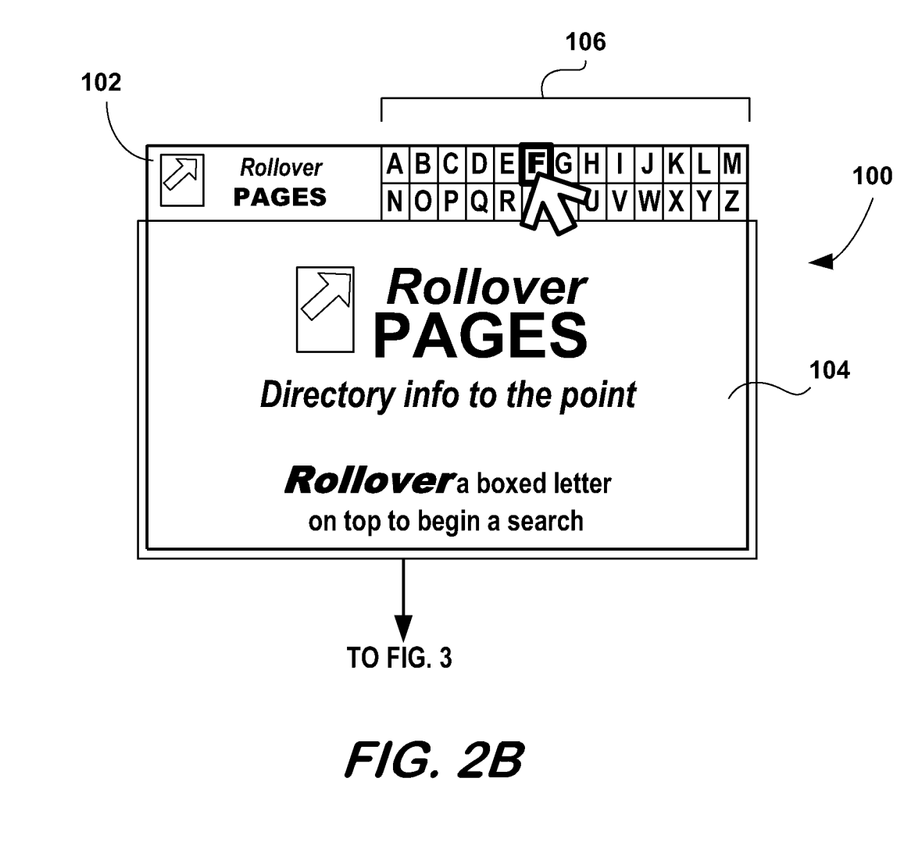
FIG. 2B is an illustration of the advantageous embodiment according to FIG. 1.

Referring now to FIG. 2A, the tool 100 is illustrated in its inactive state having the passive (smaller) footprint. However, the letter "F" is highlighted illustrating that a user has moved their courser over this part of the tool 100. As previously stated, in one advantageous embodiment, the user need not click on "F" to activate the tool 100, rather, the user need only mouse-over the "F" to activate the tool.

Once the letter "F" is moused-over, the tool transitions into its active state and expands to the active footprint including expanded area 104 as illustrated in FIG. 3. In this embodiment, the expanded area 104 comprises a first frame 108 and a second frame 110. Second tier data 112, 112' is illustrated in the first and second frames 108, 110 respectively. In this example, the second tier data 112, 112' are various alphabetical divisions relating to "F" (e.g., "Fabrics-Family", "Farms-Farming", etc.). However, as stated previously, this data can comprise any type of information, for example, if the first tier data comprises different cruise lines, the second tier data could comprise geographic cruise destinations the user could select (e.g., Caribbean, Alaskan, Canadian, Mediterranean, etc.). In other words, the second tier data will be related to the first tier data allowing a user to drill down to obtain more specific information.

In the particular embodiment illustrated in FIG. 3, the second tier data 112, 112' comprises options/categories of data related to a listing of local businesses and advertisements under the "F" listings, such as in a yellow pages listing. Going forward two examples will be provided relating advertisements found under the "F" listing of the tool.

Figure 4A:
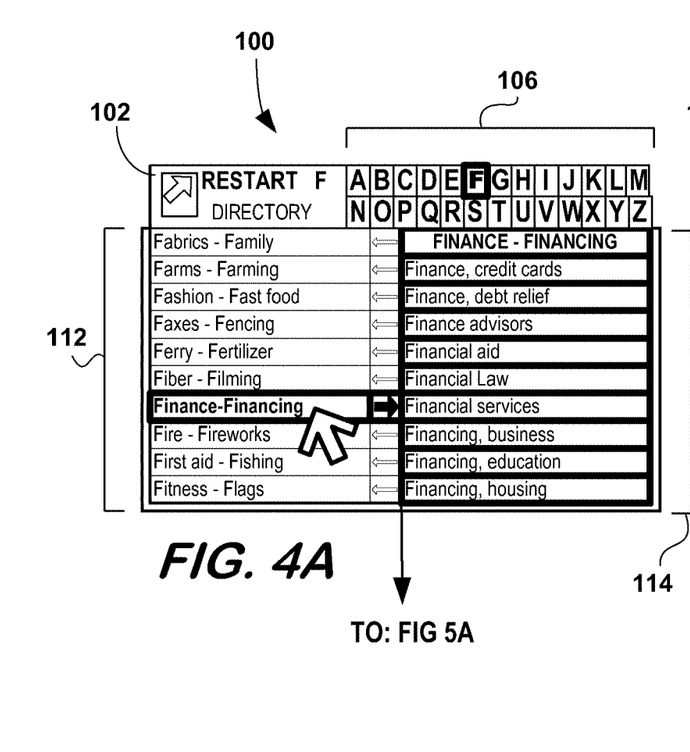
FIG. 4A is an illustration of the advantageous embodiment according to FIG. 3.

Referring to FIG. 4A, the example illustrates that the user is looking for a finance advisor. Accordingly, the user mouses-over the second tier data 112 "Finance-Financing" shown in first frame 108. When the courser moves over "Finance-Financing", a third data tier layer is launched and the second frame 110 displays third tier 114 data options/categories related to the selected second tier data 112 (i.e. "Finance-Financing"). It should be noted that in this example, the footprint of the expanded area 104 of tool 100 does not change when drilling down from second tier data 112 to third tier data 114. Rather, the second tier data options/categories 112 shown in second frame 110 is overwritten by third tier data options/categories 114.

The user is able to continue to drill downward in the listings to find a desired listing. For example, referring to FIG. 5A, the user has moused-over third tier data 114 "Finance advisors", which causes second tier data options/categories 112 in the first frame 108 to be overwritten by a launched fourth data tier layer with fourth tier data options/categories 116. In this embodiment, fourth tier data options/categories 116 are a listing of various finance advisors in the local area. While only nine are shown, it is contemplated that any number may be listed and accessed by allowing the user to, for example, scroll downward on a larger list of "Finance advisors."

Figure 6A:
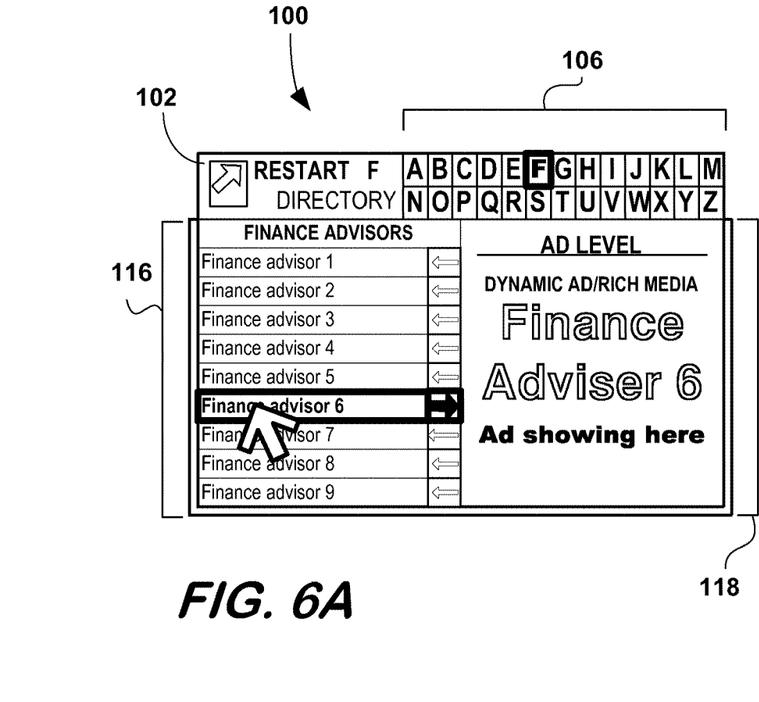
FIG. 6A is an illustration of the advantageous embodiment according to FIG. 5A.

In FIG. 6A, the user has moused-over "Finance advisor 6", which in turn has caused third tier data options/categories 114 to be overwritten by a fifth data tier 118. In this particular illustration, the fifth data tier 118 is the tool's ad level and comprises specific advertisements corresponding to any user generated fourth tier option/category selection, in this example to the "Finance advisor 6" selected. The advertisement, which can be shown in various media formats, may reside on and be delivered by, for example, an external ad server and may be pulled into the tool by ad code which is integrated into the fourth layer of the tool 100. As an indication of the new online advertising economies of scale created herein, the tool 100 as configured and as showing in FIG. 6A and FIG. 6B, contains 42,120 different ad codes in its ad level which correspond to 42,120 possible user-generated fourth tier data options/selections, and as such the tool 100 as configured has the ability to display 42,120 different user-generated advertisements. To demonstrate, the tool 100 is configured here with: 26 (first tier data options/categories)×20 (second tier data options/categories)×9 (third tier data options/categories)×9 (fourth tier data options/categories)=42,120 advertisements. However, it is contemplated that virtually any number of data options/categories can be provided as a function of the number of tiers and the number of options/categories provided for each tier. It is contemplated that the fourth tier data options/categories 116 would list the names/companies of the financial advisors, whereas a numerical listing was provided for explanation of the embodiment. Likewise, where five tiers of data and data options/categories are illustrated in this embodiment, it is contemplated that virtually any number of tiers may effectively be used depending upon the application. However, regardless of the number of tiers used, the active footprint of the tool 100 does not increase due to the alternating first and second frames displaying the next tiers of data within them. This has specific advantages over, for example, cascading windows, which have a tendency to stretch across the computer screen as the user drills down in the menu. Cascading menus therefore, are limited in that amount of information they may contain (e.g., you can only keep expanding menus as long as you have screen room to cascade another menu) and cascading menus are messy, meaning that when cascaded they leave an unsightly trail of menus across the screen that can interfere with much of the other content on the webpage and well as with the aesthetics of the webpage, causing distraction and confusion to the user.

At any point in the process of drilling down into the tool 100 and from any place within any layer in the tool 100, the user can simply mouse-out of the tool 100, which would result in the tool 100 collapsing back to its inactive state and passive footprint illustrated in FIG. 1. Another advantage of the tool 100 is that detailed user-driven information and relevant promotional material is generated by user-intuitive and low resistance mouse-overs. There are no user-hesitant click-throughs and users don't need to leave the current web page to use the tool. With just a few mouse-overs, a user can be presented with detailed and deep tiered information together with user-generated and relevant advertisements.

Figure 8:
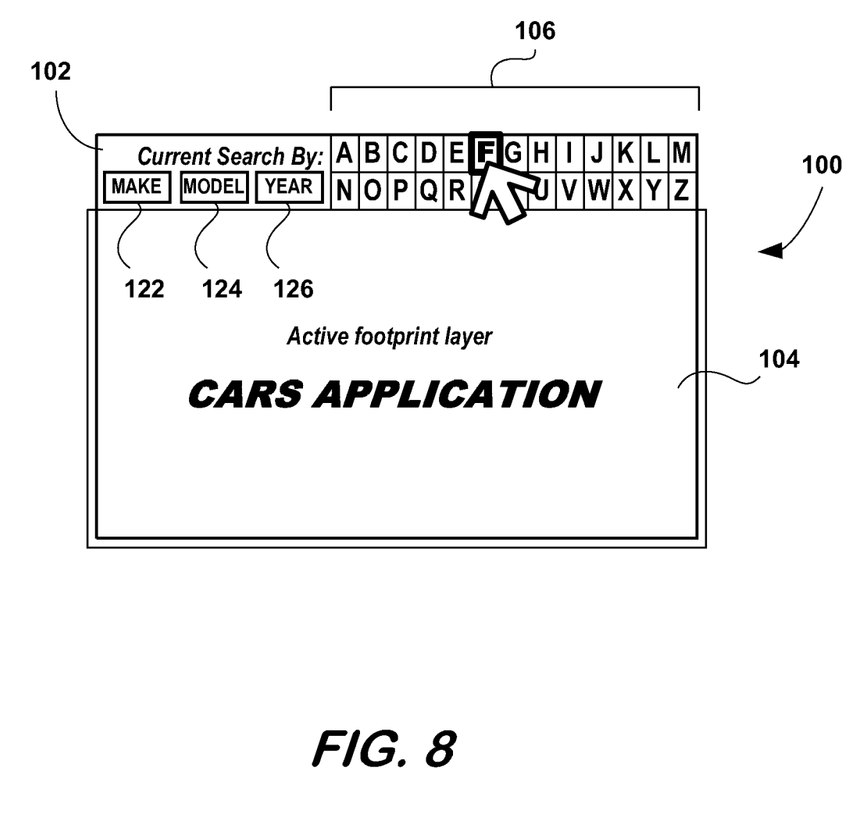
FIG. 8 is an illustration of the advantageous embodiment according to FIG. 1.

From the second data tier and on, here showing in FIGS. 3, 4A, 4B, 5A, 5B, 6A and 6B on the left side area of the tool's header 102, the tool 100 contains a "Restart" or "Reverse" area which serves to facilitate the user in navigating the two-frame multi-layered data drilling down process. At any time in the data drill down process from the second data tier and on, a user can mouse-over this restart area which results in the tool resetting itself to prior option/category layers, a function that assists and enables a user to change course for any reason, and choose a different data drill down path other than the one the user was on. In one embodiment, the "restart" button will reset the search process to a second data tier as illustrated in FIG. 3. In another embodiment, the "restart" button may reset the search process to any previous data tier selected by the user (FIG. 8). In still another embodiment, the "restart" button may function as a "reverse" button to un-drill the search process by one tier to display the previous data tier. It is understood that the tool provides the user with increased versatility to both drill-down in a search process, but also, to incrementally reverse the process without requiring the user to start the process anew.

Once the tool 100 ad level displays, as in FIG. 6A, and in this embodiment fifth tier data 118 (but it could be virtually any tier of data) corresponding to a commercial advertisement for "Finance advisor 6" (again could be an advert/promotion for anything), it is contemplated that the party being served by a corresponding fifth data tier 118 advertisement (a particular finance advisor or company) would be required to make a payment to the owner of the webpage on which the tool 100 is located. In this manner, the webpage owner on which the tool is located can derive advertising income for directing the user to the particular finance advisor's advertisement. It is further contemplated that a second or increased fee can be paid to the webpage owner if the user clicks on the fifth data tier 118 advertisement to thereby navigate the user to the finance adviser's website. It is still further contemplated that a third or further increased fee can be paid to the webpage owner if the user actually purchases goods/services from the finance adviser. As can be seen, this allows the webpage operator/owner on which the tool 100 is located to dramatically increase the potential advertising fees collected due to traffic on its website. Rather than providing only a few general advertisements on a webpage, the webpage owner can now actually include tens of thousands of user self-targeted advertisements on the same page, all within a limited page footprint, and all while providing a user-friendly resource. Additionally, the users that actually drill down to a particular advertisement are considered highly motivated and pre-screened potential consumers with a particular interest in that which they sought out, and as such, are more valuable to advertisers. This would argue in favor of providing the webpage operator with a higher fee for displaying the advertisement in the tool 100 on the webpage.

Figure 4B:
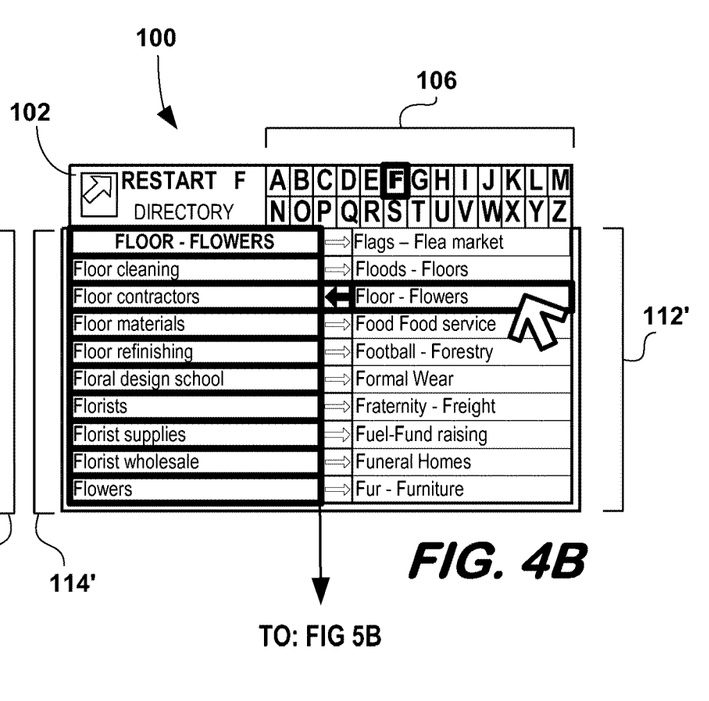
FIG. 4B is an illustration of the advantageous embodiment according to FIG. 3.
Figure 5A:
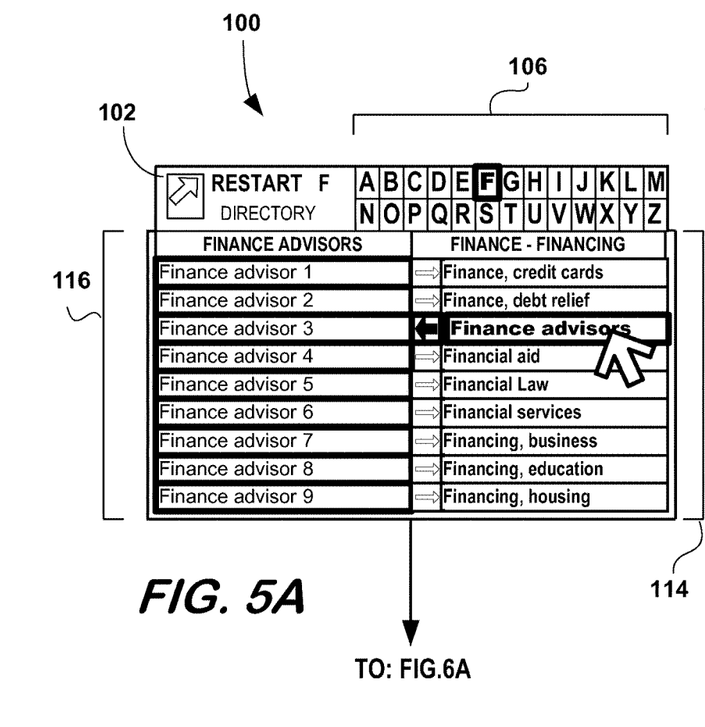
FIG. 5A is an illustration of the advantageous embodiment according to FIG. 4A.
Figure 5B:
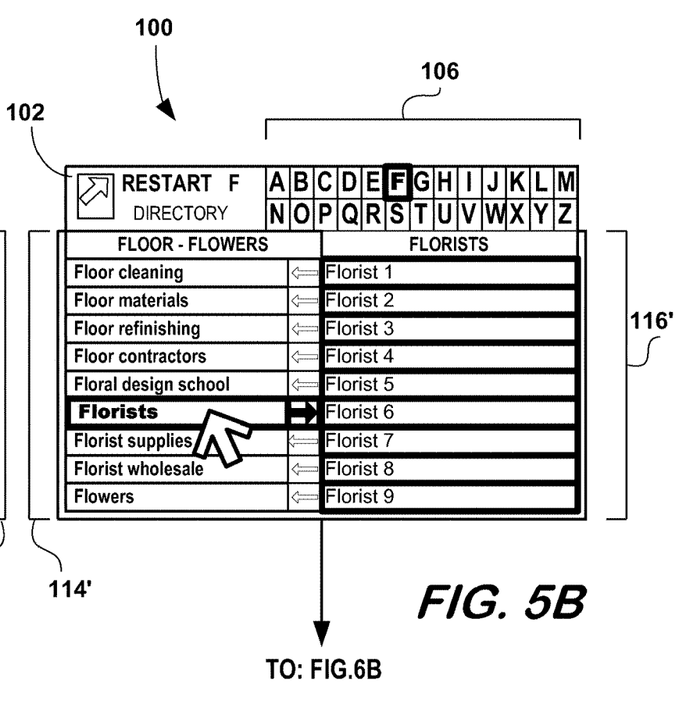
FIG. 5B is an illustration of the advantageous embodiment according to FIG. 4B.
Figure 6B:
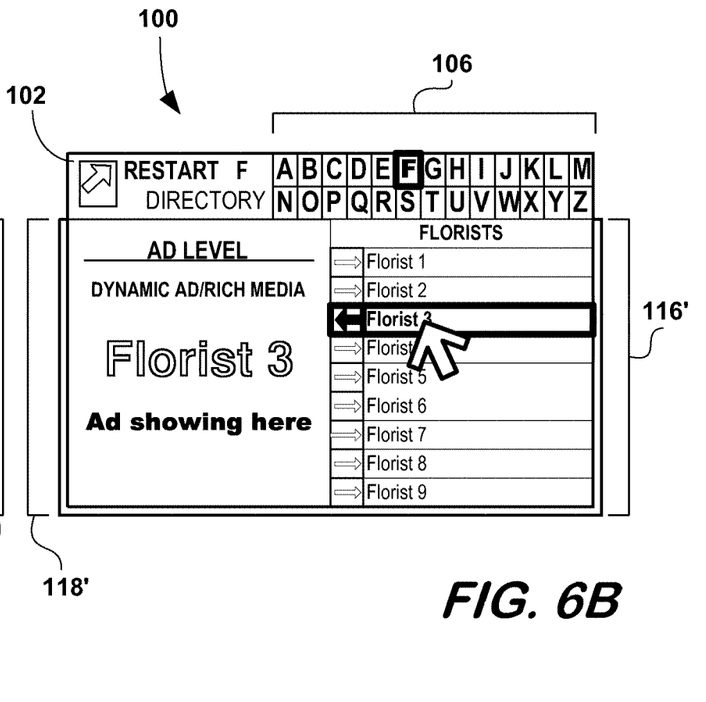
FIG. 6B is an illustration of the advantageous embodiment according to FIG. 5B.

A second example is illustrated in FIGS. 4B, 5B and 6B. The example illustrated in these Figures is similar to that disclosed in connection with FIGS. 4A, 5A and 6A, except it illustrates the second tier data category 112' is selected in the second frame 110, which causes the alternating frames to be reversed in relation to the first example previously provided. For example, in FIG. 4B the user selects second tier data category 112' "Floor-Flowers", which causes second tier data options/categories 112 in first frame 108 to be overwritten by a launched third layer with third tier data options/categories 114'. Third tier data options/categories 114' are related to the selected second tier data category 112', in this case "Floor-Flowers." Referring to FIG. 5B the user selects third tier data category 114' "Florists", which in turn causes second tier data options/categories 112' in the second frame 110 to be overwritten by a launched fourth layer with fourth tier data options/categories 116'. In this particular embodiment, the fourth tier data options/categories 116' comprise a listing of various florists in the area. While the various florists are listed as "Florist 1", "Florist 2" and so on, it is contemplated that the actual name of the florist would be listed and provided, for example, in alphabetical order.

The user may then select a particular florist (in this case "Florist 3"), which would cause the third tier data options/categories 114' in the first frame 108 to be overwritten by fifth tier data 118' (in this case the integrated ad level, which here displays an advertisement for "Florist 3"). Again, while five tiers of data have been illustrated in this particular embodiment, it is contemplated that virtually any number of tiers may effectively be utilized depending upon the application and the amount of data to be searched and the corresponding advertisements to be shown.

Once presented with the fifth tier data 118', the user may, as discussed in connection with FIGS. 4A, 5A and 6A, click on the corresponding advertisement and navigate to the "Florist 3" website.

Figure 7:
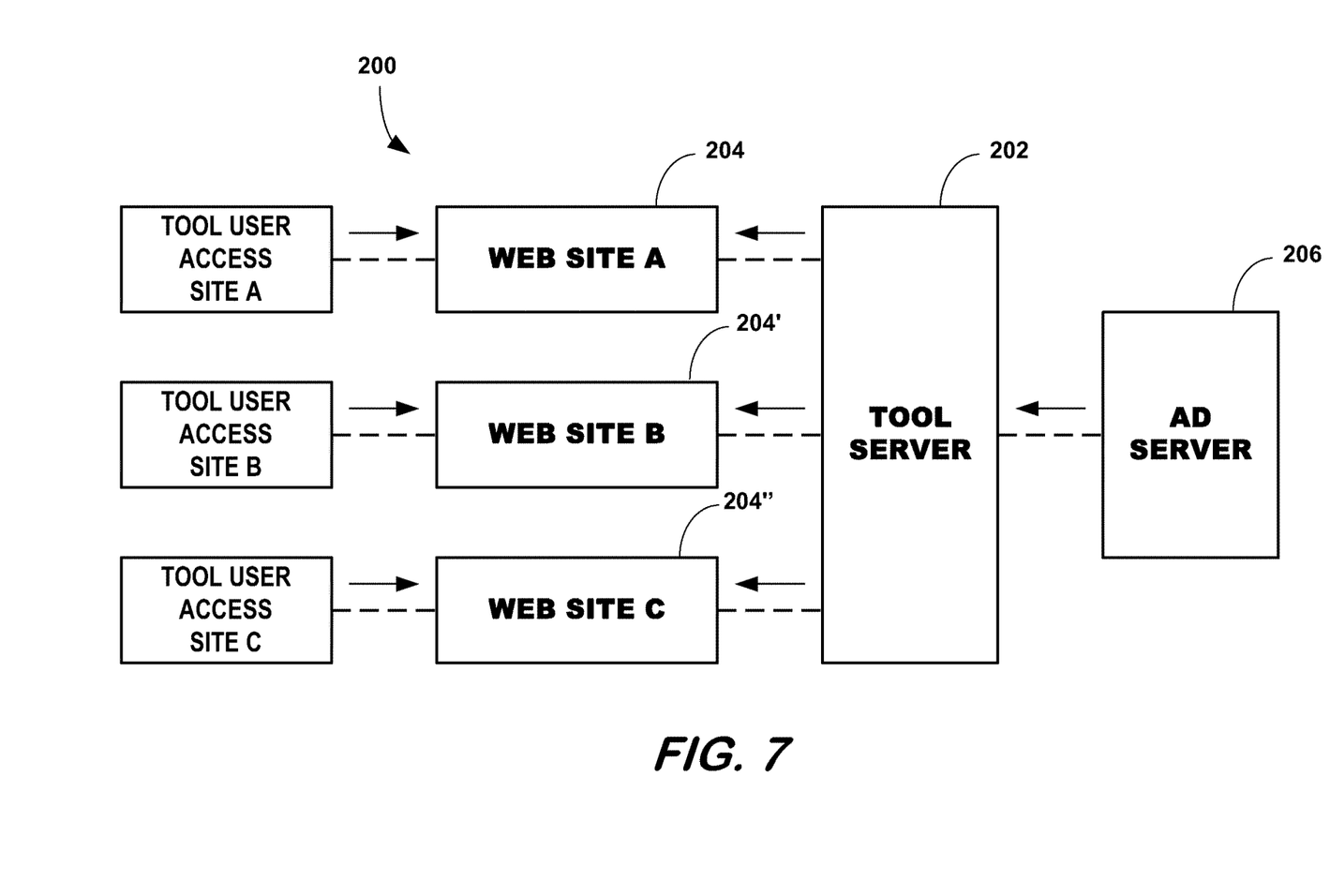
FIG. 7 is a flow diagram for the tool embodiment according to FIG. 1.

Referring now to FIG. 7, one advantageous embodiment of a system 200 for maximizing the distribution of advertisements on a webpage is illustrated as a block diagram. The system 200 may comprise, for example, a tool server 202, that is provided with a network connection and coupled to a website 204, 204', 204". The websites 204, 204', 204" may comprise various websites operated by individuals/companies that embed code such that the tool 100 may be depicted on the websites 204, 204', 204". The code may then pull the tool 100, including its ad displaying capabilities, from the tool server 202 where the tool 100 itself is loaded and resides. In this embodiment, the tool resides on the tool server 202 as opposed to the server of the website 204, 204', 204" on which the tool-pulling code is placed and on which the tool 100 is shown.

Also depicted in FIG. 7 is ad server 206, which is illustrated coupled to tool server 202. The ads themselves may, in this particular embodiment, reside on the separate ad server 206 and are pulled by code embedded in the tool's ad level (e.g., fifth tier data 118, 118'). As such, all ad server 206 capabilities are enabled within the tool 100 and may flow to virtually any site that has the code that pulls the tool 100 from the tool server 202. These capabilities may include, but are not limited to: display ads, video and rich media ads, geo-targeting for local ads, multi-ads, ad rotation, live links, etc.

Accordingly, the tool 100 provides an extremely versatile system to allow websites to maximize advertising income without consuming a lot of user-friendly valuable webpage space, while at the same time not overwhelming consumers with information or detracting from the website's primary function. The Tool 100 can be configured to serve the requirements or the needs of specific industries, advertisers, products or services and their providers, website owners/operators, and other commercial and non-commercial organizations. Tool type or topic-different versions of the tool are configurable with changes made to one or more of the following: tool sizes (initial and/or expanded footprints), amount and function of layers (including ad layers), data options/categories per layer, and ad server capabilities or functions.

Still further, it is contemplated that data tiers may include a layer designated for user comments. This layer could enable a user to enter any notes or comments and for those notes to be sent by the user to an email address. This layer would function as a data mining and information management tool whereby, for example, the user can extract specific information, organize it, or compare offerings.

While the embodiments presented illustrate an expandable tool 100, it is contemplated that a non-expandable/collapsible tool 100 could also be used. The non-expandable version of the tool 100 would start and remain in the active footprint.

A further embodiment could include a downloadable desktop version of the tool 100 that enables users and consumers to access the tool and all its dynamic information and advertising directly from their own computer. After being downloaded to the user's computer, the desktop version could launch either the collapsible or the non-collapsible version from an icon on a user's desktop.

In addition to being web distributable (by tool pulling code), the tool 100 (including its non-expandable/collapsible version) can itself be served-up as an ad to any web site via any ad server, thereby serving within that one ad, for example, many thousands of additional ads.

FIG. 8 illustrates yet another advantageous embodiment of the tool 100, in which the tool 100 is provided with car searching functionality. For example, the alpha listing could correspond to the manufacturer of the car. In this example, the selection of "F" as shown in FIG. 8 could provide a listing of car manufacturers staring with this letter (e.g. Ford, Ferrari, etc.) in the expanded area 104. It is contemplated that the user could continue to drill down in the tool 100 in an alternating manner as previously discussed in the application. This embodiment illustrates the "restart" functionality where the user may reverse or restart the searching process by selecting one of: the Make 122 button, the Model 124 button or the Year 126 button (as one example, the first data tier could provide an alpha listing corresponding to the car manufacturer, the second data tier could provide a listing of car makes (types), the third data tier could provide the car model, the four data tier could provide the car year, and the fifth data tier could provide ad for individual cars). As the user drills down into the various data tiers, the restart functionality allows the user to jump backwards in the search to select data tiers corresponding to the button selected. In this manner, the tool 100 provides the user with greatly increased versatility to both drill-down in a search process, but also, to incrementally (or selectively) reverse the process by one or more data tiers without requiring the user to start the process anew. While only three buttons are illustrated here, it is understood that additional buttons and functionality could be provided to allow the user to revert to any of the previous data tiers. It should be noted that, while various functions and methods have been described and presented in a sequence of steps (as used in connection with FIG. 8), the sequence has been provided merely as an illustration of one advantageous embodiment, and that it is not necessary to perform these functions in the specific order illustrated. It is further contemplated that any of these steps may be moved and/or combined relative to any of the other steps. In addition, it is still further contemplated that it may be advantageous, depending upon the application, to utilize all or any portion of the functions described herein.

Figure 9:
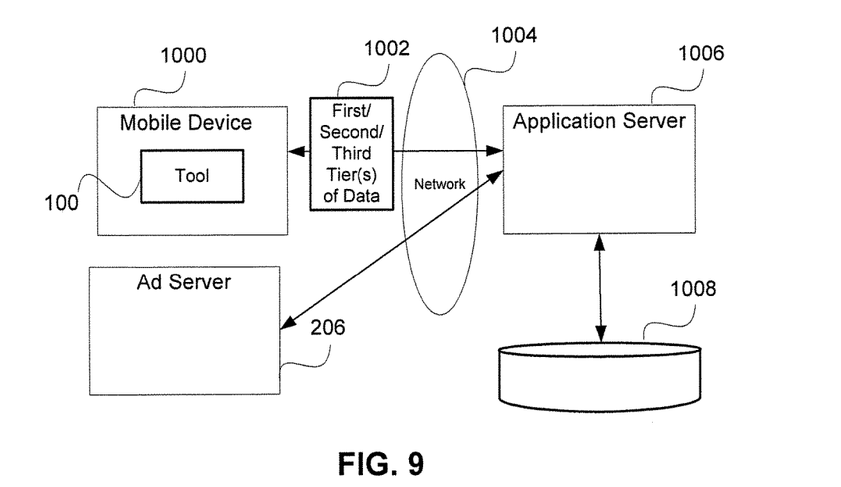
FIG. 9 is a flow diagram showing one embodiment of the tool of FIG. 1.

Referring to FIG. 9, a mobile device 1000 is in communication with an application server 1006 via a network 1004. A storage 1008 is accessible by application server 1006, which may be a storage local to the application server and may comprise removable (USB drive, external drive or the like) and non-removable devices (internal hard drive, memory or the like), or may comprise a remote storage. The storage in one embodiment stores certain data for presentation via the tool 100. The tool 100 may be installed and is configured to execute on the mobile device 1000. Ad server 206 is in communication with the application server 1006. The ad server 206 may push updates to the application server, which are then transferred to the tool 100. This may update the content or listing of the of the data categories. In some embodiments, the application server 1006 may also act as the ad server 206 in that the functionality of the two are combined to update the tool 100 as necessary or in a periodic fashion. As shown, one or more of the first, second or third tiers of data 1002 can be retrieved via the network 1004.

Figure 10:
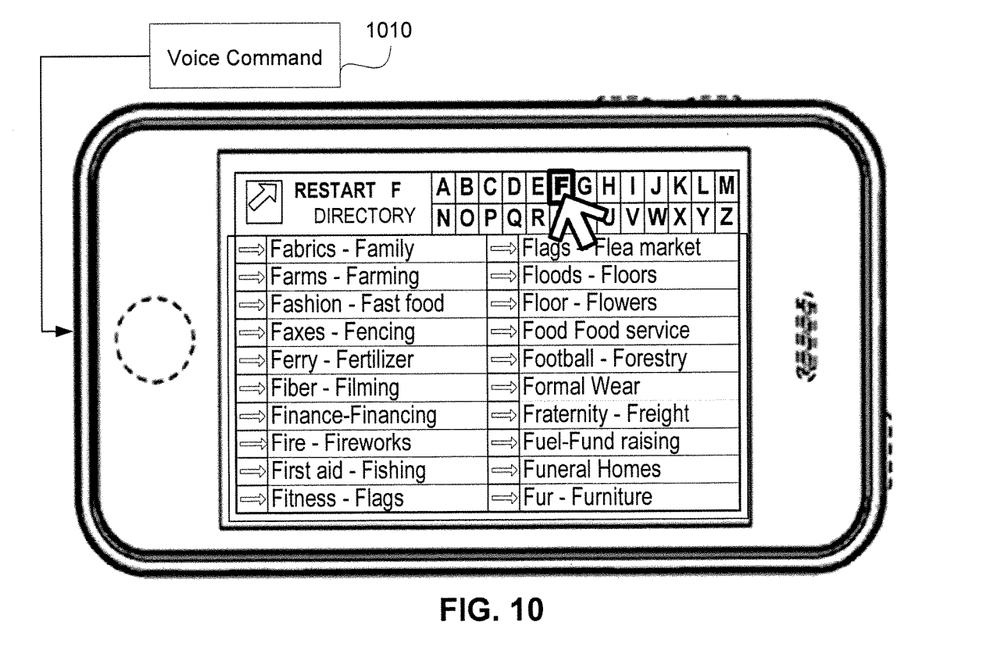
FIG. 10 is an illustration of the tool of FIG. 1 on a mobile device.

Referring to FIG. 10, the tool 100 is displayed on a mobile device. In one embodiment, the tool may be downloadable and installed as an application on the mobile device or other user device. Voice commands 1010 may be received by the mobile device to operate the tool. For example, with the tool open, if the user speaks a command to open the tool, then speaks the letter "F", the appropriate data would be displayed. The selector arrow may be moved automatically by the tool 100 or in some embodiments, the arrow would simply not be shown unless the user is selecting via other methods, such as touch. As is understood, the mobile device may be a smart phone with a touch sensitive display that allows the user to select the different tiers of data that have already been described. It should be noted that the concept of voice command to navigate the tool 100 is discussed here in connection with a mobile device 1000. However, one of skill in the art will recognize that voice commands 1010 may also be used in connection with the embodiments discussed in association with FIGS. 1-8.

Figure 11:
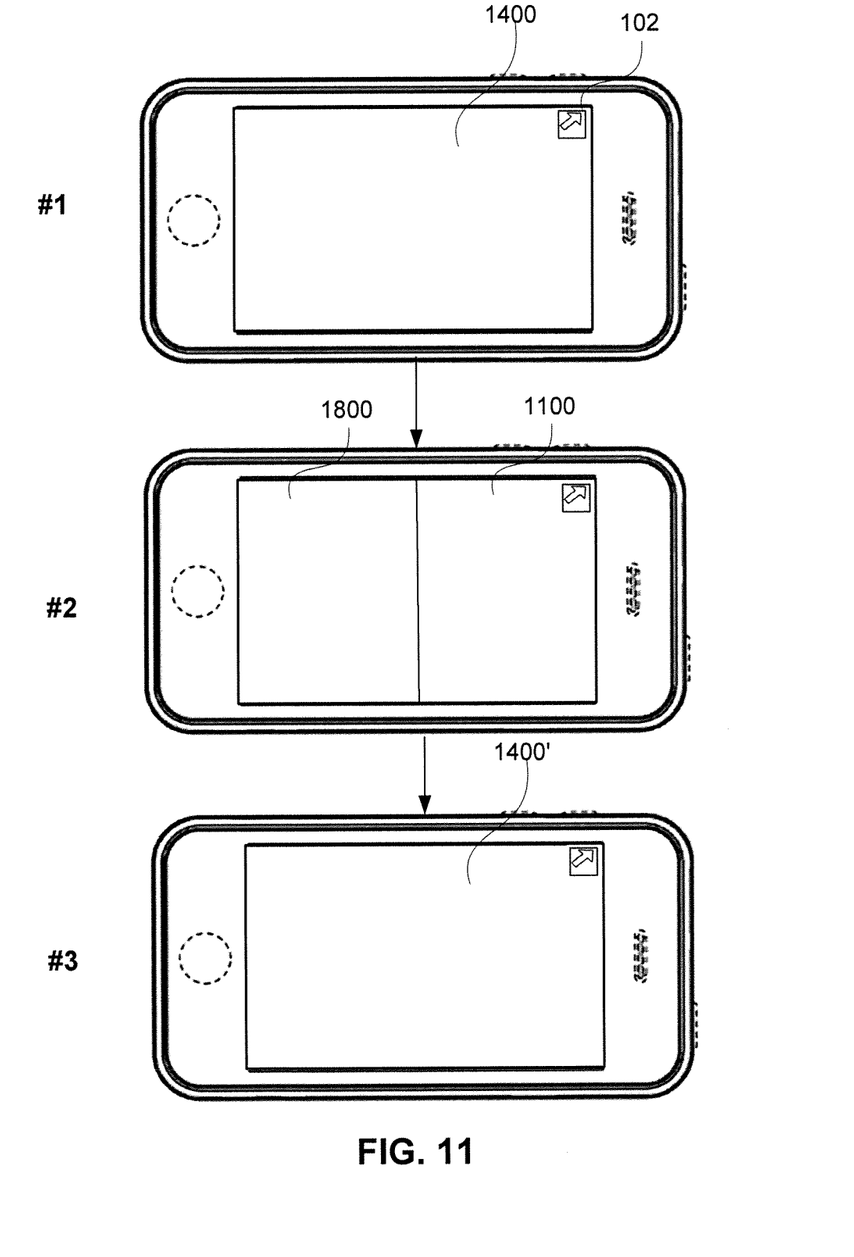
FIG. 11 is another illustration of the tool of FIG. 1 on a mobile device.
Figure 12:
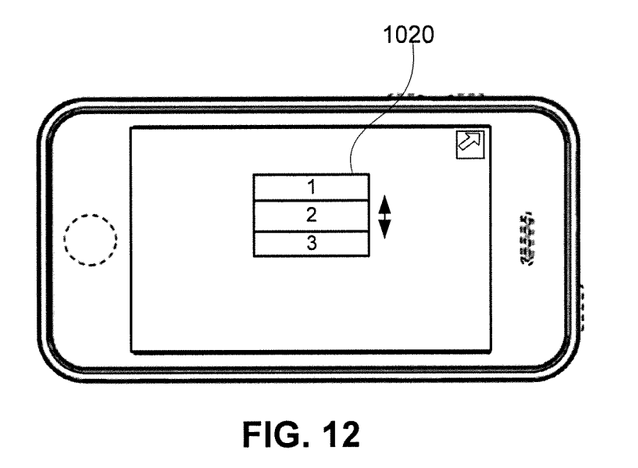
FIG. 12 is an illustration of the tool of FIG. 1 on a mobile device where the restart tool allows for selections.

FIG. 11 shows an example progression of displays through screens #1, #2 and #3. As one example, substantially the entire area 1400 may be used for presentation of data and then once a category or level of data is selected, the screen may switch to have two areas 1800/1100 while the user selects through the various categories of data. Once, the final selection is made, the screen may switch back to show substantially the entire area 1400' where the selected information is shown. For example, when "Finance Advisor 6" is selected as was described in connection with FIG. 6A, the advertisement can expand to show substantially the entire screen. It is understood that advertising is but one example of data or information that can be displayed using the tool. Restart button 102 can be used to restart the tool. In some embodiments, different selection patterns can cause the restart button to do different things. For example, one selection may go back one level whereas a longer time selecting the restart button may restart the tool back to the beginning. Different pressures may also be used to cause different levels of restarting the tool or reverting back one or multiple levels. In one aspect, a notification is shown prior to reset that asks the user to confirm the reset. In other aspects as shown in FIG. 12, when the user selects the restart button 102, a scrolling selector 1020 is displayed that shows the different levels the user has already selected in the hierarchical selection. Although 1, 2, 3 is shown for simplicity, the text presented in the scrolling selector 1020 could comprise the different selections the user previously made. Likewise, it will be understood that more than 3 selections may be displayed in the scrolling selector 1020. Thus, the user can scroll back through the previous selections to go back to a particular tier rather than having to make numerous selections to go back more than one tier. In another embodiment, once a previous selection is chosen, the tool may revert back to the display that existed when that selection was current. It is understood that in some embodiments, screen #2 may not be used and the tool will go directly from #1 to #3. It is also understood that areas 1400, 1800, 1100 and 1400' are shown without information presented for simplicity, but that the information and screens of the tool previously shown in FIGS. 1-6 may be displayed on the mobile device, which in the case shown is a mobile phone.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A system for maximizing the distribution of information on a display, comprising:
   a computer;
   software executing on said computer to present a tool for display on said computer;
   said tool having a footprint;
   said footprint comprising a first tier of data as a hierarchal listing of data categories, wherein said tool changes from a first state to a second state when one data category of said first tier of data categories is selected, said tool presents a second tier of data as a hierarchal listing of data categories that is related to said selected one data category of said first tier of data as a hierarchal listing of data categories;
   said footprint comprising a first frame and a second frame and said second tier of hierarchal listed data is presented in said first frame or said second frame;
   wherein when one data category of said second tier of data is selected said tool changes from the second state to a third state and said tool presents a third tier data that is related to said selected one data category of said second tier of data in said first frame or said second frame;
   wherein said third tier data comprises a third tier of data as a hierarchal listing of data categories and when one of the third tier data categories is selected said tool changes from the third state to a fourth state and a fourth tier of data is presented in said first frame or said second frame;

wherein the tool is configured to revert to a previous data tier when selected by the user or when the user closes the tool or selects a restart area or selects a reverse area or selects a location outside the footprint or the user navigates away from the tool or combinations thereof.

2. The system of claim 1 further comprising:
a storage accessible by said software wherein at least part of the first tier of data, the second tier of data, the third tier of data or combinations thereof is retrieved from said storage.

3. The system of claim 2 wherein said storage is accessible via an application server.

4. The system of claim 2 wherein said storage is accessible via a network connection.

5. The system of claim 2 wherein the storage is part of said computer.

6. The system of claim 1 wherein at least one of the first, second and third data categories is selected via voice command.

7. The system of claim 1 wherein said computer is a mobile device and said software is a mobile application.

8. The system of claim 1 wherein said tool is fixed in size.

9. The system of claim 1 wherein said tool is displayed on a webpage and said computer is a server.

10. The system of claim 1 wherein at least one of the first or second or third tier of data is selected from the group consisting of: an advertisement, promotional material, a webpage location or combinations thereof.

11. The system of claim 1 wherein the tool is configured to revert to the previous data tier when the user closes the tool.

12. The system of claim 1 wherein the tool is configured to revert to the previous data tier when the user selects the restart area.

13. The system of claim 1 wherein the tool is configured to revert to the previous data tier when the user selects the reverse area.

14. The system of claim 1 wherein the tool is configured to revert to the previous data tier when the user selects the location outside the footprint.

15. The system of claim 1 wherein the tool is configured to revert to the previous data tier when the user navigates away from the tool.

16. The system of claim 1 wherein the tool is configured to revert to the previous data tier when selected by the user.

17. A system for maximizing the distribution of information on a display, comprising:
a computer;
software executing on said computer to present a tool for display on said computer;
said tool having a footprint;
said footprint comprising a first tier of data as a hierarchal listing of data categories, wherein when one data category of said first tier of data categories is selected, said tool presents a second tier of data as a hierarchal listing of data categories that is related to said selected one data category of said first tier of data as a hierarchal listing of data categories;
said footprint comprising a first frame and a second frame and said second tier of hierarchal listed data is presented in a first selected frame selected from the group consisting of: said first frame, said second frame, and said first and second frames;
wherein when one data category of said second tier of data as a hierarchal listing of data categories is selected from the selected frame, said tool presents a third tier data that is related to said selected one data category of said second tier of data as a hierarchal listing of data categories in a second selected frame selected from the group consisting of: said first frame, said second frame, and said first and second frames;
wherein said third tier data comprises a third tier of data as a hierarchal listing of data categories and when one of the third tier hierarchal listed data categories is selected, a fourth tier data is presented in the a third selected frame selected from the group consisting of said first frame, said second frame and said first and second frames;
wherein the second and third selected frames are different from each other;
wherein the tool is configured to revert to a previous data tier when selected by the user or when the user closes the tool or selects a restart area or selects a reverse area or selects a location outside the footprint or the user navigates away from the tool or combinations thereof.

18. The system of claim 17 wherein the tool includes a selection area that when selected causes the tool to revert to a previous tier of data.

19. The system of claim 18 further comprising:
a storage accessible by said software wherein at least part of the first tier of data, the second tier of data, the third tier of data or combinations thereof is retrieved from said storage.

20. The system of claim 19 wherein said storage is accessible via an application server.

21. The system of claim 19 wherein the storage is part of said computer.

22. The system of claim 17 wherein the tool includes a selection area that allows the user to scroll and select between tiers of data.

23. The system of claim 17 further comprising:
a storage accessible by said software wherein at least part of the first tier of data, the second tier of data, the third tier of data or combinations thereof is retrieved from said storage.

24. The system of claim 23 wherein said storage is accessible via a network connection.

25. The system of claim 23 wherein at least one of the first, second and third data categories is selected via voice command.

26. The system of claim 17 wherein said computer is a mobile device and said software is a mobile application.

27. The system of claim 17 wherein said footprint of said tool is fixed in size.

28. The system of claim 17 wherein at least one of the first or second or third tier of data is selected from the group consisting of: an advertisement, promotional material, a webpage location or combinations thereof.

* * * * *